Jan. 20, 1970     H. J. PIEGZA     3,490,792
QUICK DISCONNECT
Filed Aug. 8, 1968     3 Sheets-Sheet 1
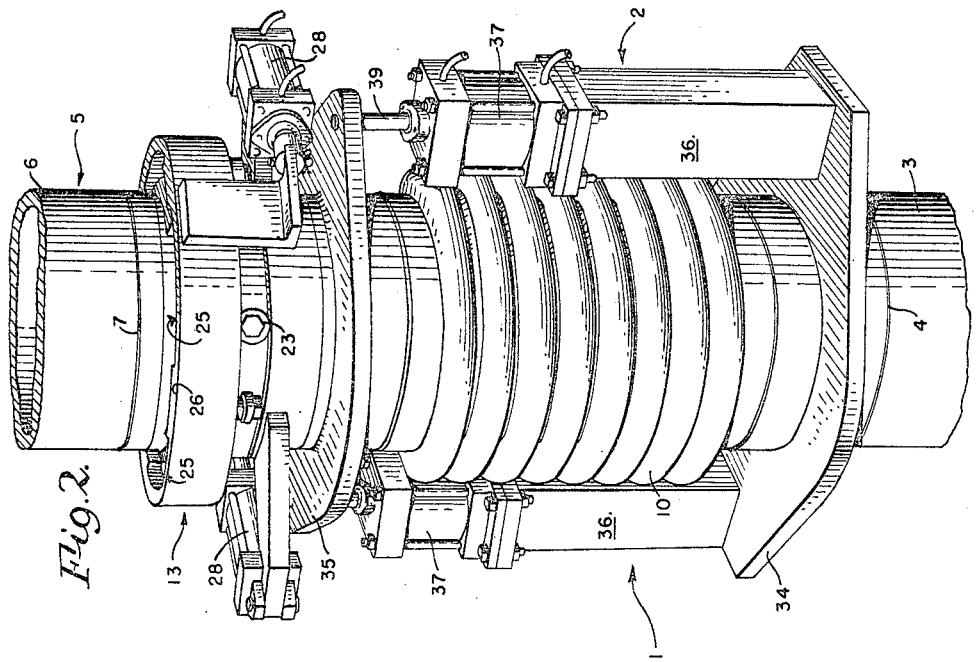
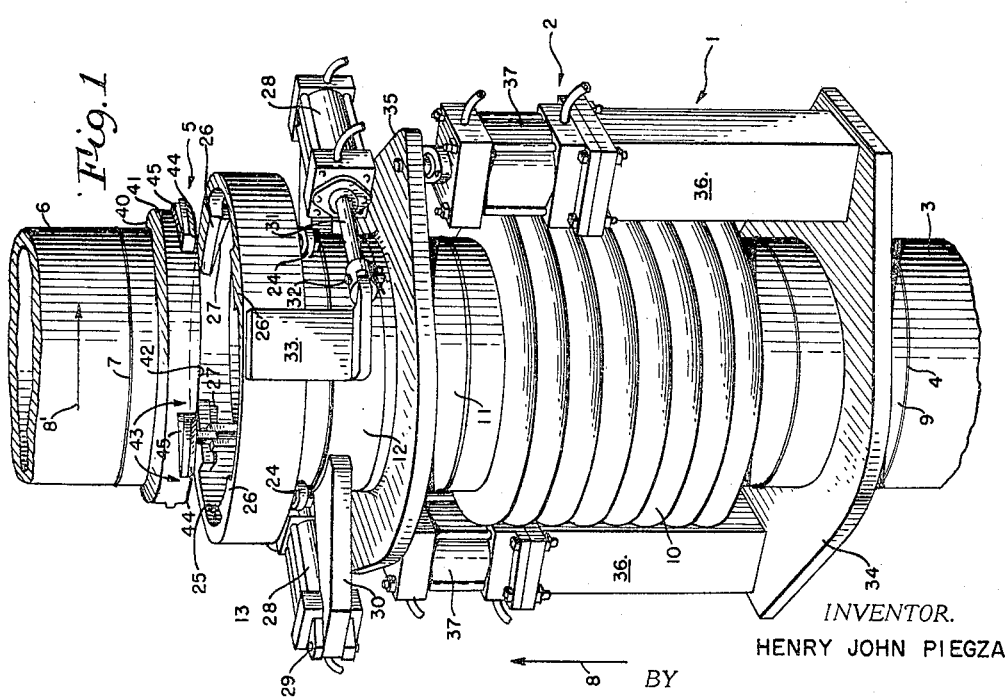
INVENTOR.
HENRY JOHN PIEGZA
BY
*Bean & Bean*
ATTORNEYS

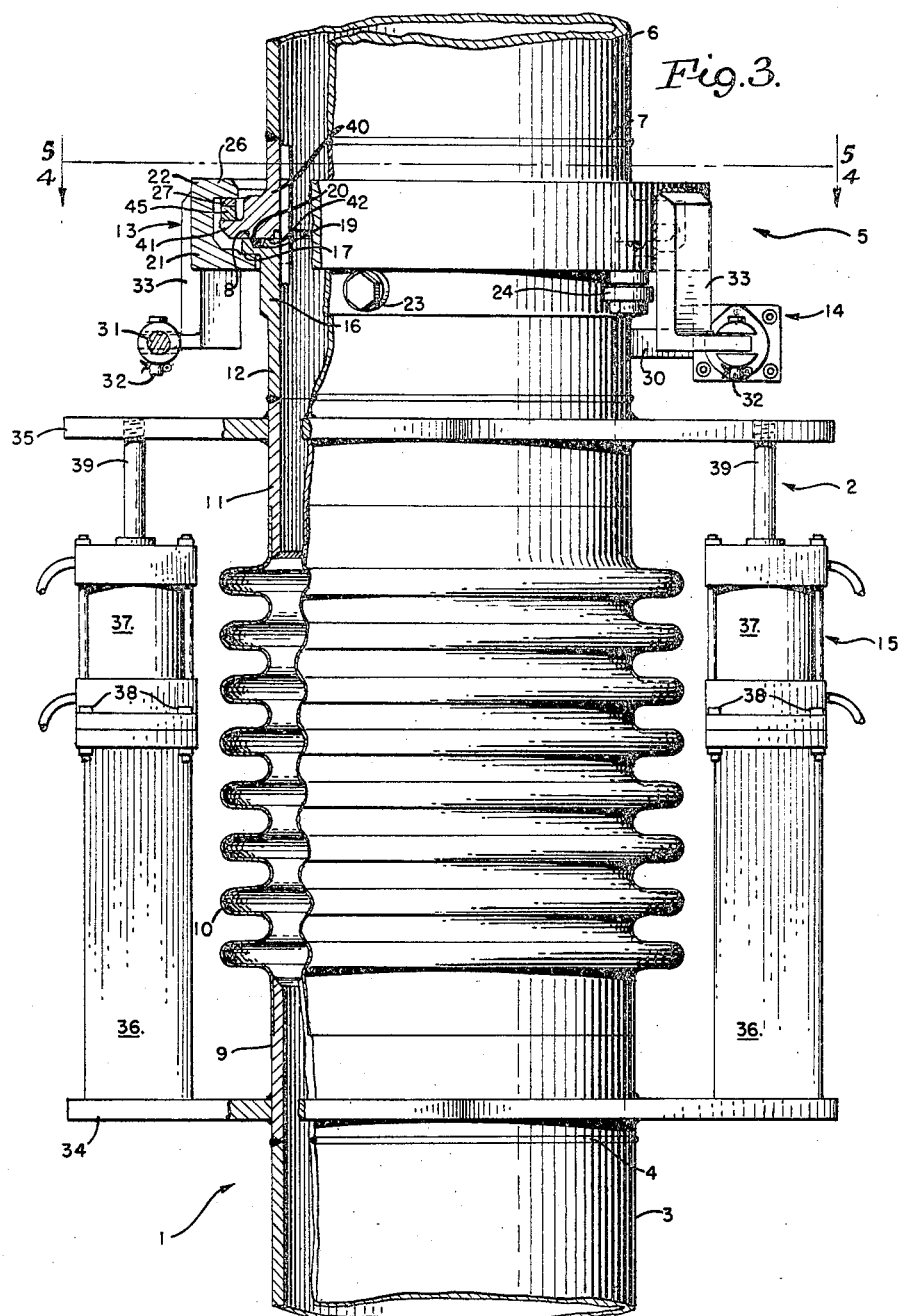

Jan. 20, 1970  H. J. PIEGZA  3,490,792
QUICK DISCONNECT

Filed Aug. 8, 1968  3 Sheets-Sheet 3

INVENTOR.
HENRY JOHN PIEGZA
BY
Bean & Bean
ATTORNEYS

United States Patent Office 3,490,792
Patented Jan. 20, 1970

3,490,792
QUICK DISCONNECT
Henry John Piegza, Clarence, N.Y., assignor to Welding & Steel Fabrication Co., Inc., Tonawanda, N.Y.
Filed Aug. 8, 1968, Ser. No. 751,183
Int. Cl. F16l *37/10*
U.S. Cl. 285—24                            4 Claims

ABSTRACT OF THE DISCLOSURE

A quick disconnect coupling construction for releasably coupling the ends of stationary and movable pressurized fluid conduits in a locked, fluid sealed relationship. The ends of the conduits are moved into and out of engagements by hydraulic means and the coupling of the ends is accomplished by rotatable cam means actuated by hydraulic means.

BACKGROUND OF THE INVENTION

The prior art is replete with disclosures of various types of quick disconnect coupling structures adapted to join relatively small diameter flexible hoses or the like, wherein an operator may with comparative ease manually join and lock together the hose ends to be coupled. However, so far as I am aware, no satisfactory quick disconnect coupling has been developed for use with relatively large, heavy conduits, or where coupling must be remotely controlled.

SUMMARY OF THE INVENTION

The present invention is directed towards a quick disconnect coupling for use with relatively large diameter pressurized fluid conduits, which permits the conduit ends to be brought together and joined in a locked fluid sealing relationship, or unlocked and separated in a matter of a few seconds.

The coupling of the present invention has particular utility when employed to connect conduits adapted to carry large quantities of hot fluid under pressure, wherein the end of one conduit is more or less permanently affixed to a stationary installation and the end of a second conduit to be coupled thereto is adapted to be moved in a direction transversely of the axis thereof in order to position the conduits in an axially aligned, end-spaced relationship, whenever fluid transfer between the conduits is desired.

In the preferred embodiment of the present invention, the quick disconnect coupling is formed in two sections, which are independently carried, one on each of the conduits to be coupled. One of the coupled sections has rotatably supported thereon a locked ring having cam surfaces which are adapted, when the sections are disposed in an aligned operative position, to cooperate with mating cam surfaces provided on the other coupling section for the purpose of positively engaging sealing means carried on the respective coupling sections and locking the sections together in a fluid sealing relationship. The sealing means and locking ring of the first coupling section are preferably supported for axial reciprocating movement with respect to its associated conduit by a flexible metal bellows in order to permit the sealing means and locking ring to be transferred to or separated from an operable position adjacent the second coupling section.

The utilization of a flexible bellows in the quick disconnect coupling of the present invention, additionally permits such coupling to serve as an expansion joint when the conduits to be coupled are employed to carry high temperature fluid.

Further, the present invention anticipates the utilization of fluid pressure actuated cylinders to control both the coupling section positioning and locking operations in order to permit such operations to be remotely controlled in cases where the nature of the installation or danger to personnel does not permit manual operation of the coupling by a workman.

The nature and mode of operation of the quick disconnect coupling of the present invention will be more clearly understood by reference to the following description taken with the accompanying drawing.

THE DRAWING

FIG. 1 is a perspective view of the quick disconnect coupling of the present invention showing the coupling sections separated;

FIG. 2 is a perspective view similar to FIG. 1, but showing condit sections joined and locked in a fluid sealed relationship;

FIG. 3 is a side elevational view of the quick disconnect coupling shown in FIG. 2, with portions broken away for clarity;

Figure 4:
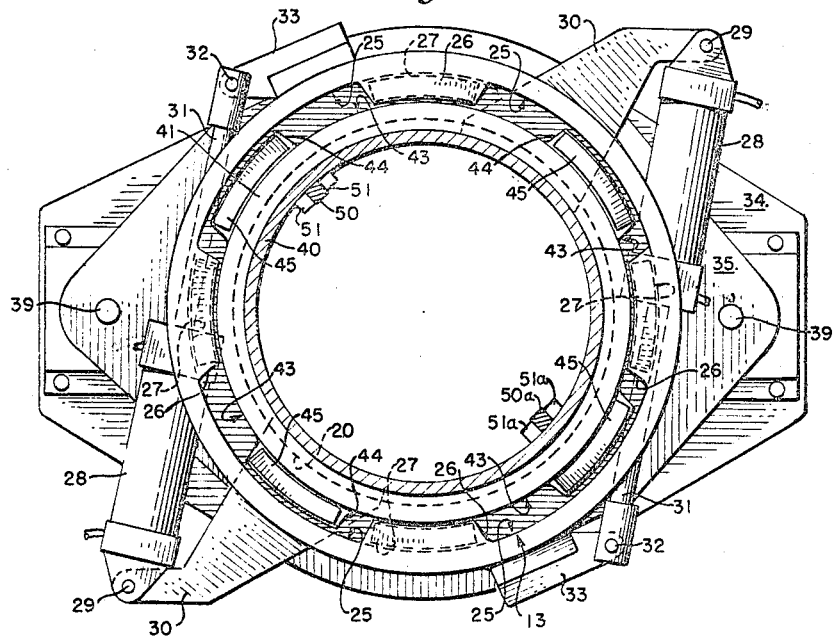
FIG. 4 is a sectional view taken generally along the line 4—4 in FIG. 3, but showing the coupling unlocked.

The quick disconnect coupling of the present invention is generally designated as 1 and shown particularly in FIGS. 1, 2 and 3 as including a first section 2, which is adapted to be affixed to the end of a first conduit 3, as by welding at 4; and a second section 5, which is adapted to be affixed to the end of a second conduit 6, as by welding at 7. While in the drawings, the axis of coupling sections 2 and 5 are shown as being vertical, it will be understood that they may be horizontally arranged, if desired, and that the coupling sections when vertically positioned may be inverted from the position shown.

While the coupling of the present invention possesses utility in installations where in both of conduits 3 and 6 are movably supported, it possesses particular utility and therefore will be primarily discussed with reference to installations wherein one or the other of such conduits, as for instance conduit 3, is permanently supported in a fixed position and conduit 6 is mounted on means, not shown, for movement along a path which is disposed transversely of the axis of conduit 3. For instance, conduit 3 may extend from the outlet of a stationary tank or reservoir of fluid under pressure, not shown, and conduit 6 may extend to the inlet of one of a plurality of carriage mounted smaller chambers which are adapted to pass by and be successively coupled to the stationary tank.

In FIG. 1, coupling 1 is shown as being disconnected with coupling sections 2 and 5 spaced apart, but with their axes disposed in alignment. From this position, section 2 may be moved in the direction indicated by arrow 8 into operable position adjacent section 5 and the sections thereafter locked together, as will be hereinafter more fully discussed with reference to FIGS. 2–5, or conduit 6 moved from the area of conduit 3, as for instance, in a direction transversely of the conduit axes, as indicated by arrow 8'. Any suitable means, not shown, may be employed to initially position coupling section 5 in alignment with coupling section 2 prior to placing the sections in operative position.

Now referring particularly to FIG. 3, it will be seen that coupling section 2 generally comprises: a conduit extension including ring member 9, flexible bellows 10, ring member 11, and mounting ring 12, which are disposed in axial alignment with conduit 3 and joined as by welding; a locking ring which is generally designated as 13 and adapted to be rotatably supported on mounting ring member 12; a locking ring actuating mechanism, generally designated as 14; and a section extending and retracting mechanism generally designated as 15.

Mounting ring 12 is best shown in FIG. 3 as including a radially extending annular flange 16, which is provided with spaced, radially extending machined surfaces 17 and 18. Radially extending surface 18 is preferably formed with an annularly extending slot recess 19, which is disposed concentrically of the axis of mounting ring and adapted to receive a compressible sealing gasket 20, whose composition and configuration may vary depending upon service conditions for which the coupling structure is designed.

The locking ring 13 is shown in the drawings as being of generally U-shaped cross section, wherein radially, inwardly extending leg portions 21, 22 are adapted to straddle mounting flange 16. The inwardly facing, radially extending surface of leg portion 21 is shown in FIG. 3 as being positioned in slidable surface engagement with mounting flange surface 17 by means of a plurality of guide rollers 23 which are carried on mounting ring 12. Locking ring 13 is mounted for rotation on mounting ring 12 about an axis in alignment therewith by means of a plurality of rollers 24, which are journaled on leg portion 21. When locking ring 13 is thus positioned, the inwardly facing, radially extending surface of leg portion 22 is maintained in a faced, spaced relationship with respect to mounting ring surface 18.

By again referring to the drawings it will be understood that locking ring leg portion 22 is provided with a plurality of circumferentially spaced slot openings generally indicated at 25, which define intermediate portions 26 provided on the inwardly facing surfaces thereof with suitably affixed hardened, tapered, wedged shaped cam elements 27.

Figure 5:
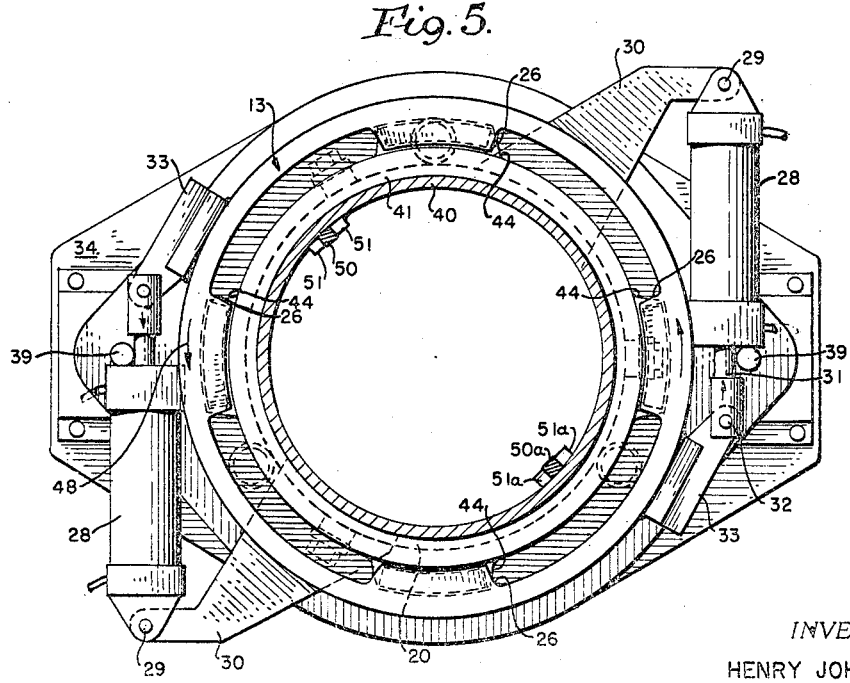
FIG. 5 is a view similar to FIG. 4, but showing the coupling locked.

Locking ring 13 may be rotated with respect to mounting ring 12 by mechanism 14 from a coupling joined unlocked position, indicated in FIG. 4, to a coupling locked position, indicated in FIG. 5. Preferably, mechanism 14 includes a pair of oppositely acting fluid operated cylinders 28, which are pin supported, as at 29, on mounting ring weldments 30, and have rods 31 which are pin connected, as at 32, to locking ring weldments 33. Any suitable means, not shown, may be employed to control admission of operating fluid to cylinders 28.

Coupling section expanding and contracting mechanism 15 is shown particularly in the FIGS. 1, 2 and 3, as including a pair of end mounting plates 34 and 35, which are disposed in a parallel relationship and joined, as by welding to ring members 9 and 11, respectively; a pair of mounting standards 36, which are affixed at one end to mounting plate 34 and disposed parallel to the axis of coupling section 2; and a pair of double acting fluid operated cylinders 37, which are mounted adjacent one end thereof on mounting standards 36, by any suitable means such as mounting bolts 38. In FIG. 3, the piston rdos 39 of fluid cylinders 37 are shown as being threadably connected to mounting plate 35. As in the case of fluid cylinders 28, any suitable means, not shown, may be employed to control admission of operation fluid to cylinders 37.

It will be apparent from the foregoing that extension and contraction of cylinders 37 acts to vary the distances between mounting plates 34 and 35, and thus serves to expand or compress bellows 10 in a direction axially thereof. In that mounting ring 12 is supported on bellows 10, movement of the latter will in turn force mounting ring 12 to reciprocate axially thereof in the direction indicated by arrow 8 in FIG. 1.

The utilization of flexible bellows 10 to movably connect mounting ring 12 to conduit 3, rather than possibly a slip fit connection between ring members 9 and 11, produces a coupling which is not only of greatly simplified construction, but one in which there are no sliding seals to replace due to wear or clogging. While bellows 10 is preferably formed of metal, so as to withstand high temperature and pressure operating conditions, other suitable flexible materials may be employed.

Coupling section 5 is in the form of a mounting ring member 40 having a radially extending annular flange 41, which is provided with a radially extending surface 42 machined to define a sealing surface adapted to cooperate with sealing gasket 20 carried on mounting ring 12 of coupling section 2. Referring particularly to FIGS. 1 and 4, it will be seen that annular flange 41 is provided with a plurality of circumferentially spaced slot openings generally indicated at 43, which define intermediate portions 44, on which are mounted hardened, tapered, wedge cam surface elements 45.

By referring particularly to FIG. 1, it will be understood that when coupling section 2 is moved in the direction indicated by arrow 8 by the extension of fluid cylinders 37 to position it in operative position adjacent coupling section 5, as indicated in FIG. 2, intermediate portions 44 are caused to pass through locking ring slot openings 25 in order to place mounting ring sealing surface 42 adjacent sealing gasket 20 with the surfaces of wedge elements 27 and 45 being disposed in a facing, circumferentially spaced relationship, as indicated in FIG. 4. Thereafter, when locking ring 13 is rotated in the direction indicated by arrows 48 by the contraction of fluid cylinders 28 into its locked position shown in FIG. 5, the surfaces of wedge elements 27 and 45 cooperate to lock coupling sections 2 and 5 together, and to force sealing gasket 20 into operative sealing engagement with mounting ring sealing surface 42 to form an annularly arranged fluid seal between the mating ends of the coupling sections. Coupling sections 2 and 5 may be uncoupled by reversing the locking and coupling positioning operations just described.

In order to facilitate the maintaining of alignment of coupling sections 2 and 5 when mounting ring 12 of coupling section 2 is reciprocated to bring the mating ends of the coupling sections together in the manner described, there is provided a pair of guide bars 50, 50a which are carried on opposite sides of ring member 40 and adapted to be slidably received between pairs of guide bars 51 and 51a, respectively, carried on mounting ring member 12.

Preferably, subsequent to the locking together of coupling sections 2 and 5 in the manner described, pressure is relieved from cylinders 27 to permit free relative movement between the ends of bellows 10. This permits the coupling to function as an expansion joint for cases wherein the conduits connected thereby are employed to transfer hot fluids. Although for purposes of the present invention, bellows 10, when the coupling sections are locked together, may be subject to either slight compression, slight tension, or be in equilibrium axially thereof, it is preferable, particularly in the case where conduits to be joined are employed to transfer hot fluids, that the bellows be subject to a slight initial tension so that under operating conditions tension stresses within the bellows will be relieved or cancelled by normal thermal expansion of the bellows and other parts of the coupling. Further, by extending or stretching the normally compressed bellows to place the coupling sections in operable position, fewer bellows folds or pleats are necessary to achieve a given overall displacement of mounting ring 12.

While the coupling of the present invention has been described with particular reference to the affixing of the coupling sections on conduits, it will be understood that one or both coupling sections may be directly coupled to the outlet of a reservoir or source of fluid, or the inlet of a receiving chamber without the necessity of providing intermediate conduit sections. Thus, the recitation of flow source means and flow receiver means, as used in the appended claims, is meant to include situations where the coupling sections are mounted or affixed either to conduits or directly to the inlet or outlets of fluid receivers or sources.

Also, while the coupling of the present invention is particularly adapted for use as a high temperature fluid coupling, it may however, be employed to couple conduits used to transfer either liquid, gases or particulate solids.

I claim:
1. A quick disconnect coupling including a pair of coupling sections sections separately and independently mounted on and in flow communication with a flow source means and a flow receiver means, respectively, said coupling sections each including a ring member disposed on the mating end thereof, said ring members each having sealing means, a first of said ring members rotatably supporting a generally U-shaped locking ring member for rotational movement between coupling unlocked and coupling locked positions, said locking ring member having first and second leg portions straddling said first ring member in a direction axially of its associated coupling section, said first leg portion having alternately spaced first cam members and axially through slot openings arranged circumferentially thereof, said first cam members being disposed in facing relation to said second leg portion, a second of said ring members having second cam members spaced circumferentially thereof such that said second cam members may pass axially inwardly of said locking ring member through said slot openings when disposed in circumferential alignment therewith, said second cam members facing in a direction away from the mating end of the coupling section with which said second ring member is associated, said coupling sections being provided with guide means, said guide means guidingly maintaining said second cam members in circumferential alignment with said slot openings when said mating ends of said coupling sections are brought together and said locking ring is in said coupling unlocked position, said locking ring member when said mating ends of said coupling sections are brought together to place said ring members in an axially aligned relationship and said second cam members inwardly of said locking ring member being adapted to be rotated with respect to said ring members between said coupling unlocked and coupling locked positions to force said first cam members into operative engagement with said second cam members whereby said sealing means are forced into a sealingly engaged relationship to form an annularly arranged flow seal between mating ends of said coupling sections, one of said ring members of one of said coupling sections being connected in flow communication with one of said flow means by a bellows member disposed in axial alignment with said one ring member, and said one coupling section includes operating means carried thereon to effect expansion and contraction of said bellows member to effect reciprocation of said one ring member axially thereof, whereby when said ring members are disposed in an axially aligned relationship said one ring member may be reciprocated to bring together or separate said mating ends of said coupling sections.

2. The coupling according to claim 1, wherein said first ring member is supported on said bellows.

3. The coupling according to claim 2, wherein mounting plate means are affixed adjacent the ends of said bellows, said mounting plates being interconnected by fluid cylinder means operable to vary the distance between said plates to effect expansion and contraction of said bellows in a direction axially thereof.

4. The coupling according to claim 3, wherein said locking ring is interconnected to said first ring member by fluid cylinder means, said fluid cylinder means being operable to effect rotation of said locking ring.

References Cited

UNITED STATES PATENTS

| 1,185,049 | 5/1916 | Best | 285—406 |
| 1,385,157 | 7/1921 | Smith | 285—27 X |
| 1,853,411 | 4/1932 | Gentry et al. | 285—391 X |
| 2,317,729 | 4/1943 | Bruno | 285—27 X |
| 2,788,498 | 4/1957 | Hardaway | 285—359 X |
| 2,916,143 | 12/1959 | McConalogue. | |
| 3,298,680 | 1/1967 | Jablin | 285—18 |

FOREIGN PATENTS

| 854,763 | 11/1960 | Great Britain. |

DAVID J. WILLIAMOWSKY, Primary Examiner

D. W. AROLA, Assistant Examiner

U.S. Cl. X.R.

285—299, 308, 358